United States Patent [19]

Burdette

[11] 4,157,834

[45] Jun. 12, 1979

[54] SEAL SYSTEM

[75] Inventor: Fredrick E. Burdette, Torrance, Calif.

[73] Assignee: The Garrett Corporation, Los Angeles, Calif.

[21] Appl. No.: 888,583

[22] Filed: Mar. 20, 1978

[51] Int. Cl.² ............................................. F16J 15/42
[52] U.S. Cl. ........................................ 277/13; 277/67; 277/133; 415/175
[58] Field of Search ...................... 415/175, 53 R, 111, 415/112, , 116, 169 R, 170 R; 277/13, 14 R, 14 V, 25, 59, 67–69, 74, 133–135, 226, DIG. 1

[56] References Cited

U.S. PATENT DOCUMENTS

| 2,581,504 | 1/1952 | Wilfley et al. | 277/13 X |
| 2,687,096 | 8/1954 | Armacost | 415/175 |
| 2,830,755 | 4/1958 | Anderson | 415/175 |
| 2,936,715 | 5/1960 | Southarm et al. | 415/175 X |
| 3,180,568 | 4/1965 | Oettle | 415/175 X |
| 3,213,798 | 10/1965 | Carswell | 277/67 X |
| 3,494,679 | 2/1970 | Burdette | 277/133 X |

FOREIGN PATENT DOCUMENTS 1394361  2/1965  France ...................... 415/175

Primary Examiner—Robert S. Ward, Jr.
Attorney, Agent, or Firm—Stuart O. Lowry; Albert J. Miller

[57] ABSTRACT

A seal system for sealing passage of a rotatable shaft through a wall separating adjacent regions subject to differential fluid pressures. The system comprises a flange on the wall circumferentially spaced from the shaft. A ring rotatable with the shaft includes an axially extending enlargement concentrically about the flange in engagement with the wall for slinging fluid away from the wall opening. A drain gutter radially outwardly from the enlargement collects fluid draining down the wall, and guides the same away from above the wall opening.

27 Claims, 3 Drawing Figures

SEAL SYSTEM

BACKGROUND OF THE INVENTION

This invention relates to a seal system. More specifically, this invention relates to oil seal arrangements particularly adapted for use with a thrust bearing system in a turbocharger for controlling axial shaft motion and for sealing against oil leakage.

In a turbocharger, a turbine wheel and a compressor impeller are carried on a common shaft. The turbine wheel is received within a turbine housing for communication with exhaust gases from an engine, whereby the shaft is rotatably driven during engine operation. The shaft is supported by suitable journal bearings and thrust bearings within a center housing connected between the turbine housing and a compressor housing receiving the compressor impeller. The exhaust gas driven turbine wheel thereby drives the compressor impeller to compress charge air for supply to the intake of the engine, all in a well known manner.

Typically, the rotating shaft in a turbocharger is capable of being driven at relatively high rotational speeds, such as on the order of about 100,000 rpm. Such rotational speeds require the use of precision bearing components together with an effective system of bearing lubrication. In this regard, lubricating oil is commonly pumped under pressure to the turbocharger center housing for lubricating the shaft bearings to prevent excessive bearing heating and wear.

The effective lubrication of turbocharger shaft bearings without leakage of oil from the center housing, particularly into the compressor housing, has long been a troublesome problem in the design of turbochargers. Specifically, during normal operation of the turbocharger, fluid pressures in the region between the backplate of the compressor housing and the compressor impeller are frequently less than the fluid pressure within the center housing. Thus, a pressure differential is created tending to cause oil leakage from the center housing around the rotating shaft into the compressor housing. This leakage tendency is substantially enhanced by the high rotational speeds of the shaft which cause relatively rapid wear of sealing components such as seal rings and the like.

Another major problem in the design of turbochargers has been to provide a thrust bearing system capable of withstanding high shaft speeds without excessive wear. This is because the turbocharger shaft typically experiences varying axial directional loads in accordance with the relative pressures within the compressor and center housings. In the prior art, a variety of thrust bearings have been provided together with lubricant supply schemes therefor, and may be conveniently combined with a shaft oil seal arrangement. These prior art bearing and seal systems have included holes, grooves, flanges, and the like for slinging oil particles provided for lubricating the thrust being away from the passage of the shaft into the compressor housing to help deter oil leakage. Some of these systems have further included oil seal ring arrangements to further guard against leakage. See, for example, U.S. Pat. Nos. 3,494,679; 3,393,947; 3,077,296; 2,953,416; 2,785,022; 2,362,667 and 2,054,219. These prior art devices have not been totally satisfactory, however, in that oil leakage problems in commercial turbochargers have not been entirely overcome.

The thrust bearing seal system of this invention overcomes the problems and disadvantages of the prior art by providing an improved seal system for combination with a thrust bearing system for axially constraining a turbocharger shaft and for sealing against oil leakage into the compressor housing.

SUMMARY OF THE INVENTION

In accordance with the invention, a thrust collar is secured on a turbocharger shaft for rotation therewith. The thrust collar includes an axially extending boss lining the passage of the shaft through an opening in a compressor backplate forming a boundary wall between a compressor housing and a center housing. The thrust collar boss carries one or more seal rings interfitting between the collar and the backplate within the opening to assist in preventing oil leakage.

The compressor backplate includes an annular, axially extending flange projecting into the center housing around and spaced from the turbocharger shaft. Radially outwardly from the flange, the backplate is relieved to form an annular wall facing axially into the center housing, and including an axially projecting annular land. From the land, the annular wall extends radially outwardly, and is further relieved to form an enlarged oil splash chamber surrounding the shaft, and including a radially outwardly presented oil drain gutter for collecting excess oil and guiding the same to an oil drain.

The thrust collar further includes a pair of axially spaced, radially outwardly projecting annular rings for receiving a horseshoe-shaped thrust bearing for securing the thrust collar and shaft in the desired axial position. The annular ring adjacent the backplate includes an axial enlargement shaped to fold concentrically about the backplate flange and to bearingly abut the annular land on the backplate. This enlargement includes a pair of axially spaced rows of outwardly radiating slinger holes which serve as vanes upon rotary movement of the shaft to centrifugally sling oil particles radially away from the backplate opening. Any particles draining down the backplate are collected by the drain gutter, and guided away from the backplate opening to prevent leakage.

BRIEF DESCRIPTION OF THE DRAWINGS

The accompanying drawings illustrate the invention. In such drawings.

DETAILED DESCRIPTION OF THE PREFERRED EMBODIMENT

Figure 1:
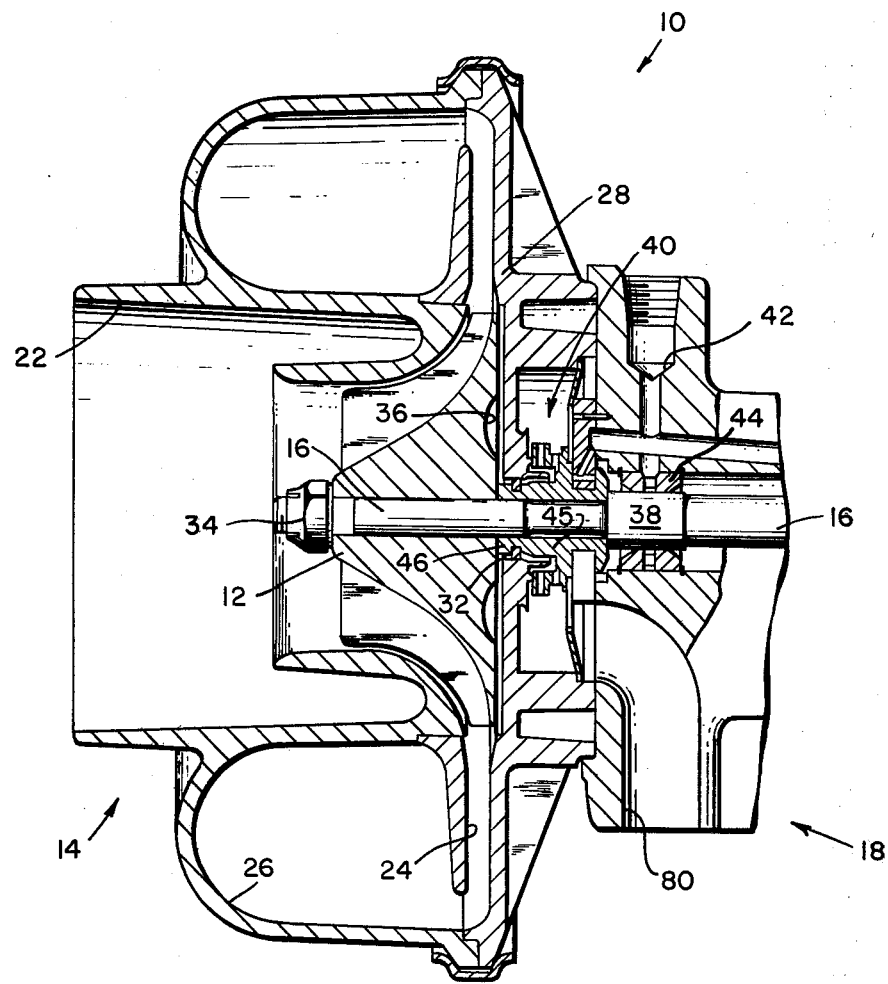
FIG. 1 is a fragmented vertical section of the compressor end of a turbocharger showing a seal system of this invention.

A portion of a turbocharger 10 is shown in FIG. 1, and comprises a compressor impeller 12 carried upon a rotatable shaft 16 within a compressor housing 14. The shaft 16 extends from the impeller 12 through a turbocharger center housing 18 for connection to a turbine carried within a turbine housing (not shown). In operation, exhaust gases from an internal combustion engine are supplied to the turbine (not shown) to rotatably drive the turbine, and thereby also rotatably drive the turbocharger shaft 16. Such driving causes corresponding rotation of the impeller 12 within the compressor housing 14 serving to draw air through an inlet 22 of the compressor housing. The impeller 12 compresses the drawn air, and discharges it centrifugally through a diffuser 24 into a passage 26. From the passage, the compressed air may be supplied to the intake of an internal combustion engine.

As shown in FIG. 1, the center housing 18 and compressor housing 14 are separated by a common compressor backplate 28. The shaft 16 extends through the center housing 18, through a central passage 32 in the compressor backplate 28, and into the compressor housing 14. The compressor impeller 12 is received over one end of the shaft 16 within the compressor housing, and is secured thereon for rotation therewith as by a nut 34. Importantly, the backside 36 of the impeller is spaced slightly from the backplate 28 so as not to interfere therewith during impeller rotation. During rotation of the impeller 12, air is normally compressed within the compressor housing 14 whereby a superatmospheric pressure prevails around the periphery of the impeller. However, during at least some periods of turbocharger operation, the pressure within the compressor housing at the backside 36 of the impeller 12 adjacent the backplate opening 32 is reduced relative to pressure within the center housing. When this occurs, it is necessary to provide a sealing system to prevent leakage of oil through the backplate opening 32.

Figure 2:
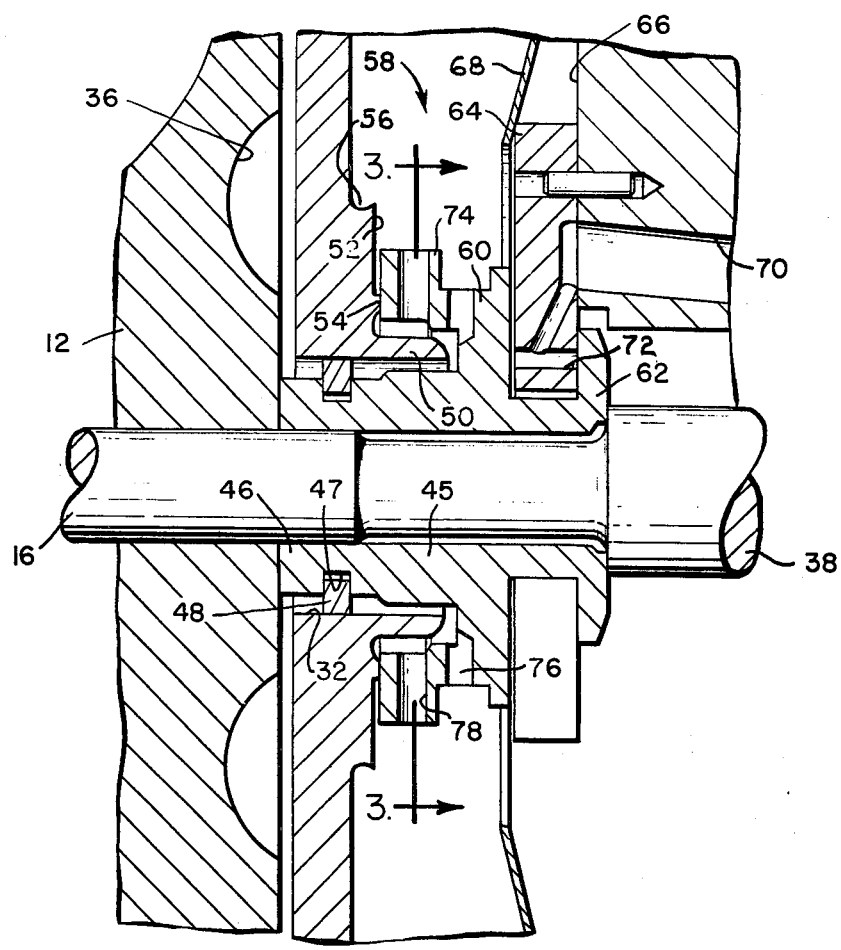
FIG. 2 is an enlarged fragmented vertical section of a portion of FIG. 1.
Figure 3:
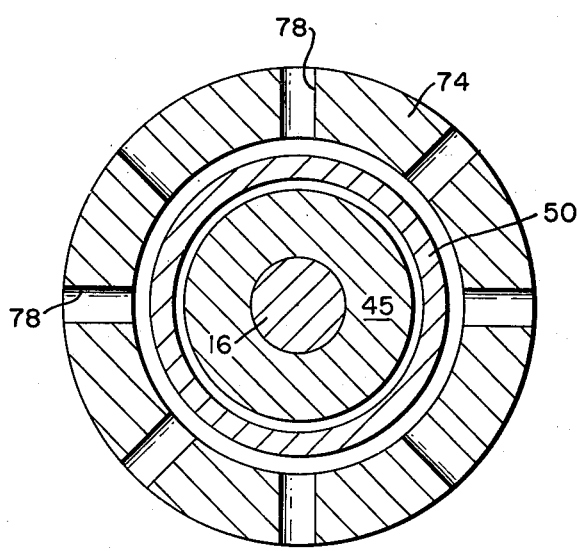
FIG. 3 is a vertical section taken on the lines 3—3 of FIG. 2.

As shown in detail in FIGS. 1-3, the shaft 16 includes an enlarged portion 38 received within suitable journal bearings 44 assuring smooth shaft rotation. While two sets of journal bearings 44 are shown in FIG. 1, it should be understood that multiple sets of such bearings may be provided as needed. Importantly, the center housing 18 includes an oil supply passage 42 through which a suitable supply of lubricating oil is provided to the journal bearings 44 to prevent excessive heating or wear thereof.

In a similar manner, a thrust bearing system 40 is provided for controlling undesirable axial movement of the shaft 16. The thrust bearing system 40 comprises a thrust collar 45 snugly received over the shaft 16 abuttingly between the enlarged shaft portion 38 and the backside 36 of the impeller 12. Thus, the thrust collar 45 includes a boss portion 46 extending through and lining the passage of the shaft 16 through the backplate opening 32. Importantly, the thrust collar 45 rotates with the shaft 16, and includes one or more annular recesses 47 each for receiving a seal ring 48 to help seal against oil leakage through the opening 32.

As shown best in FIG. 2, the thrust collar 45 and the backplate 28 are matingly configured to protect against undesirable oil leakage through the opening 32. More specifically, the backplate 28 includes an axially extending annular flange 50 surrounding the shaft 16 and the thrust collar boss 46, and extending into the center housing 18. Radially outwardly from the flange 50, the backplate 28 is relieved to provide an annular wall 52 facing into the center housing 18 and including an axially projecting annular land 54. From the land 54, the wall 52 extends radially outwardly, and is further relieved to provide a relatively large oil splash chamber 58 surrounding the shaft 16 and thrust bearing system 40.

The thrust collar 45 includes a pair of integral annular rings 60 and 62 axially spaced from each other for receiving a generally horseshoe-shaped thrust bearing 64. Specifically, the thrust bearing 64 is received over the thrust collar 45 between the two rings 60 and 62, and is retained against a wall 66 of the center housing 18 as by a spring 68. Thus, the thrust bearing 64 serves to control axial movement of the thrust collar 45 on the shaft 16. Importantly, a passage 70 in the center housing 18 is provided for feeding of lubricant from the oil passage 42 to the thrust bearing 64. The thrust bearing 64 may include additional passages 72 for supplying the lubricant to contact surfaces between the thrust bearings 64 and the collar 45, and may further include a plurality of Kingsbury-type ramps of the type disclosed in detail in U.S. Pat. No. 3,494,679 for bearingly engaging the collar rings 60 and 62.

The annular ring 60 of the thrust collar 45 includes a cantilevered enlargement 74 folding concentrically over the annular flange 50 of the compressor backplate 28. As shown, this cantilevered enlargement 74 terminates in abutting engagement with the annular land 54 of the recessed wall 52. Importantly, the enlargement 74 is provided with two rows of circumferentially spaced, radially open oil slinger holes 76 and 78, with the holes 78 being shown in detail in FIG. 3. As shown in FIG. 2, the first row of slinger holes 76 is provided generally at the axial termination of the flange 50, and the second row of holes 78 is disposed between the first row 76 and the land 54.

In operation of the turbocharger, the thrust bearing system 40 of this invention axially contains the shaft 16, while at the same time helping to prevent oil leakage through the backplate opening 32. In particular, the thrust collar 45 rotates relatively high rotational speeds along with the shaft 16, while the thrust bearing 64 maintains the shaft 16 and the collar 45 in the desired axial position. Oil is supplied to the center housing 18 through the passages 42 and 70 to lubricate the journal bearings 44 and the thrust bearing 64, respectively. Any oil tending to leak through the backplate opening 32 is centrifugally accelerated by the rapid rotation of the rows of slinger holes 76 and 78 whereby the oil is thrown radially outwardly into the enlarged splash chamber 58. More specifically, the slinger holes 76 and 78 serve as vanes to create a centrifugal air flow within the center housing which throws oil particulate radially away from the flange 50 and the seal ring 48 into the splash chamber 58.

The backplate 28 is configured so that oil thrown outwardly by means of the slinger holes 76 and 78 is guided to an oil reservoir without draining onto the thrust bearing system 40 or through the backplate opening 32. More specifically, the radially outward extent of the relieved face 52 includes a radially outwardly presented drain gutter 56, preferably having a generally U-shaped cross section as shown. This drain gutter 56 extends at least over the top of the thrust bearing system 40, as shown in FIGS. 1 and 2, to conduct oil thrown upwardly into the splash chamber 58 down into the lower portion of the splash chamber. That is, the gutter 56 collects oil draining down the backplate 28, and guides the collected oil around the bearing system 40 away from the backplate opening 32 and toward an oil sump 80. In this manner, oil adjacent the backplate opening 32 is thrown away from the opening by the slinger holes 76 and 78, and is prevented from draining back to the opening by the drain gutter 56.

The thrust bearing and seal system of this invention provides accurate axial shaft control with substantially positive leak-free results. Specifically, the seal system prevents oil leakage regardless of the relative fluid pressures within the compressor and center housings 14 and 18, respectively. Importantly, it should be understood that this invention may include a variety of modifications without varying from the scope of the invention. In particular, it is contemplated that the invention may be used in a wide variety of applications wherein it is necessary to isolate working fluids on opposite sides of a boundary wall, and to seal passage of a shaft through the wall.

What is claimed is:

1. A seal system for sealing passage of a rotatable shaft through an opening in a wall separating regions subject to differential pressures comprising an axially extending annular flange projecting from said wall in circumferentially spaced relation with said shaft; first means mounted for rotation with said shaft adjacent the wall opening and including an annular enlargement extending axially toward said wall concentrically about said flange for moving fluid radially away from said flange and the wall opening, said enlargement being in running engagement with said wall radially outwardly from said flange; and second means on said wall radially outwardly from said enlargement and extending over at least the top of the wall opening for collecting fluid draining down said wall and for guiding the collected fluid away from above the wall opening, whereby draining fluid uncollected by said second means is redirected radially outwardly away from the wall opening by said enlargement.

2. A seal system as set forth in claim 1 wherein said first means comprises a thrust bearing system.

3. A seal system as set forth in claim 1 wherein said first means comprises a thrust collar mounted on said shaft for rotation therewith and including a pair of axially spaced, radially outwardly projecting rings for receiving a thrust bearing for axially supporting said shaft, said enlargement being formed on the one of said rings adjacent said wall and including a plurality of outwardly radiating slinger holes serving upon shaft rotation to move fluid radially away from the wall opening.

4. A seal system as set forth in claim 3 wherein said thrust collar comprises a unitary collar.

5. A seal system as set forth in claim 1 wherein said enlargement includes a plurality of axially spaced rows of slinger holes.

6. A seal system as set forth in claim 3 wherein said collar includes an annular boss projecting into the wall opening, said boss and said wall being circumferentially spaced from each other with limited clearance.

7. A seal system as set forth in claim 6 wherein said boss includes at least one radially outwardly presented, circumferential recess disposed within the wall opening, and including a seal ring received within said recess in sealing engagement with said wall.

8. A seal system as set forth in claim 1 wherein said enlargement includes a first row of outwardly radiating slinger holes disposed generally about the axial termination of said flange, and a second row of outwardly radiating slinger holes about said flange between said first row and said wall.

9. A seal system as set forth in claim 1 wherein an axially projecting annular land is formed on said wall about the wall opening, and said enlargement abuttingly engages said land.

10. A seal system as set forth in claim 1 wherein said second means comprises a radially outwardly presented drain gutter.

11. A seal system as set forth in claim 10 wherein said wall includes an axially presented annular face about the wall opening, said face being axially relieved at its radially outward extent to form said drain gutter over at least the upper portion of the wall opening and to form a relatively enlarged chamber for receiving fluid moved radially outwardly from the wall opening.

12. A seal system as set forth in claim 11 wherein said drain gutter has a generally U-shaped cross section.

13. A seal system as set forth in claim 11 wherein said axially presented annular face includes an axially projecting annular land, said enlargement abuttingly engaging said land.

14. A seal system for sealing passage of a rotatable shaft through an opening in a wall separating regions subject to differential pressure comprising an axially extending annular flange projecting from said wall in circumferentially spaced relation with said shaft; a collar mounted on said shaft for rotation therewith and including a radially outwardly projecting ring, said ring including an annular enlargement extending axially toward said wall in circumferentially spaced relation about said flange and in running engagement with said wall, said enlargement having a first row of outwardly radiating slinger holes disposed generally about the axial termination of said flange and a second row of outwardly radiating slinger holes disposed generally about said flange between said first row and said wall, said rows of slinger holes serving upon shaft rotation to move fluid radially away from the wall opening; and a drain gutter on said wall radially outwardly from said enlargement and having a generally U-shaped cross section opening radially outwardly over at least the top of the wall opening for collecting fluid draining down the wall and for guiding the collected fluid away from above the wall opening, whereby draining fluid uncollected by said gutter is redirected radially outwardly away from the wall opening by said enlargement and rows of slinger holes.

15. A seal system as set forth in claim 14 wherein said collar comprises a thrust collar including first and second radially projecting rings for receiving a thrust bearing for axially securing said shaft, and further including an annular boss projecting into the wall opening with limited clearance, said boss having at least one radially outwardly presented circumferential recess disposed within the wall opening, and including a seal ring received within said recess in sealing engagement with said wall.

16. A seal system as set forth in claim 19 wherein said wall includes an axially projecting annular land in abutting engagement with said enlargement.

17. A seal system for sealing passage of a rotatable shaft through an opening in a wall separating regions subject to differential pressures comprising a thrust collar mounted on said shaft for rotation therewith and including an annular boss projecting into the wall opening with limited clearance, and a pair of axially spaced and radially outwardly projecting rings; a circumferential recess formed on said boss within the wall opening; a seal ring received within said recess in sealing engagement with said wall; a thrust bearing received between said rings for axially supporting said shaft; an axially extending annular flange on said wall projecting toward said collar rings and circumferentially spaced from said collar; an annular enlargement formed on the one of said rings adjacent said wall and extending toward said wall in circumferentially spaced relation with said flange and abuttingly engaging said wall, said enlargement including a first row of outwardly radiating slinger holes disposed generally about the axial termination of said flange and a second row of outwardly radiating slinger holes about said flange between said first row and said wall, said rows of slinger holes serving upon shaft rotation to move fluid radially away from the wall opening; and a radially outwardly presented drain gutter on said wall radially outwardly from said enlargement and extending over at least the top of the wall opening for guiding fluid draining down said wall away from above said opening.

18. A seal system as set forth in claim 17 wherein said wall includes an axially projecting annular land about the wall opening and abuttingly engaging said enlargement.

19. A seal system as set forth in claim 17 wherein said wall is axially relieved radially outwardly from said enlargement to form said drain gutter and to form a relatively enlarged chamber for receiving fluid moved radially away from the wall opening.

20. In a system having a rotatable shaft received through an opening in a wall separating regions subject to pressure differentials, and means for moving fluid radially away from one side of the wall opening, a method of sealing the wall opening comprising the steps of forming an axially extending annular flange projecting from said wall in circumferentially spaced relation with the shaft; mounting said fluid moving means concentrically about said flange and in running engagement with said wall; and forming a radially outwardly presented drain gutter on said wall radially outwardly from the means for moving fluid, and extending over at least the top of the wall opening for collecting fluid draining down the wall and for guiding the collected fluid away from above the wall opening.

21. In a system having a rotatable shaft received through an opening in a wall separating regions subject to pressure differentials, a method of sealing the wall opening comprising the steps of providing an axially extending annular flange on said wall in circumferentially spaced relation with the shaft; mounting first means on said shaft adjacent one side of the wall opening concentrically about said flange and in running engagement with said wall for moving fluid radially outwardly from the wall opening; and providing second means radially outwardly from said first means for collecting fluid draining down the wall and for guiding the collected fluid away from the wall opening.

22. The method of claim 21 wherein said step of providing said first means comprises the steps of mounting a collar on said shaft; forming an annular boss on said collar projecting into the wall opening with limited clearance; forming a circumferential recess on said boss within the opening; and receiving a seal ring within the recess in sealing relation with said wall.

23. The method of claim 21 wherein said step of providing said first means comprises the steps of mounting a collar on said shaft for rotation therewith; forming an annular enlargement on said collar extending axially toward the wall for abutting engagement therewith; and forming a plurality of outwardly radiating slinger holes in said enlargement for moving fluid upon shaft rotation radially away from the wall opening.

24. The method of claim 23 including the steps of forming said plurality of slinger holes being formed to include a first row of slinger holes disposed generally about the axial termination of said flange and a second row of slinger holes between the first row and said wall.

25. The method of claim 23 wherein said step of forming the drain gutter comprises the step of axially relieving the wall radially outwardly from the enlargement to form said drain gutter and to form a relatively enlarged chamber for receiving fluid moved radially away from the wall opening.

26. The method of claim 23 including the step of forming an annular land on said wall about the wall opening for abuttingly engaging said enlargement.

27. In a system having a rotatable shaft received through an opening in a wall separating regions subject to pressure differentials, a method of sealing the wall opening comprising the steps of mounting a thrust collar on the shaft for rotation therewith, said thrust collar including a boss projecting into the wall opening with limited clearance and a pair of axially spaced, radially projecting rings for receiving a thrust bearing for axially securing the shaft; forming a circumferential recess on said boss within the wall opening; receiving a seal ring within said recess in sealing engagement with said wall; forming an axially extending annular flange on said wall in circumferentially spaced relation with said collar; forming an annular enlargement on the one of said collar rings adjacent said wall and extending axially toward said wall for abutting relation therewith and circumferential spaced relation with said flange; forming a first row of outwardly radiating slinger holes in said enlargement generally about the axial termination of said flange and a second row of outwardly radiating slinger holes in said enlargement about said flange between said first row and said wall, said rows of slinger holes serving upon shaft rotation to move fluid radially away from the wall opening; and forming a radially outwardly presented drain gutter on said wall radially outwardly from said enlargement and extending over at least the top of the wall opening for collecting fluid draining down the wall and for guiding the collected fluid away from the wall opening.

* * * * *

UNITED STATES PATENT AND TRADEMARK OFFICE
CERTIFICATE OF CORRECTION

PATENT NO. : 4,157,834
DATED : June 12, 1979
INVENTOR(S) : Fredrick E. Burdette

It is certified that error appears in the above—identified patent and that said Letters Patent are hereby corrected as shown below:

Column 1, line 58, "being" should read --bearing--.

Claim 16, line 1, "19" should read --14--.

Signed and Sealed this

Twenty-third Day of October 1979

[SEAL]

Attest:

RUTH C. MASON
Attesting Officer

LUTRELLE F. PARKER
Acting Commissioner of Patents and Trademarks